UNITED STATES PATENT OFFICE.

ALBERT TOCA, OF NEW ORLEANS, LOUISIANA.

FROZEN CONFECTION AND PROCESS OF MAKING THE SAME.

1,134,777.

Specification of Letters Patent.

Patented Apr. 6, 1915.

No Drawing. Application filed May 28, 1914. Serial No. 841,579.

*To all whom it may concern:*

Be it known that I, ALBERT TOCA, a citizen of the United States, residing at New Orleans, in the parish of Orleans and State of Louisiana, have invented certain new and useful Improvements in Frozen Confections and Processes of Making the Same, of which the following is a specification.

This invention relates to frozen confections and processes of making the same, and one of the principal objects of the invention is to provide a confection which shall be digestible, wholesome and palatable, and which shall be comparatively inexpensive to manufacture.

Another object of the invention is to provide a frozen dessert of delicate flavor which shall be wholesome and digestible and to provide a process for making said dessert which shall be comparatively inexpensive to carry out.

In the development of my invention I utilize the following materials in substantially the proportions given:

Choice rice_____ Two ounces,
Barley_____ Eight ounces,
Hominy_____ Eight ounces.

These grains are placed in an agate pot of about five gallons capacity containing three gallons of cool fresh water. Place the pot with its contents on a smokeless fire and let it boil for one and one-half hours. Then strain through a cleaned doubled cheesecloth tied around the top of a seven and one-half gallon porcelain container. The substance goes into the container and the hot grains remain in the cheesecloth; then the cheesecloth is removed from the container and twisted with the grains in it. Holding it twisted, the cheesecloth and grains are placed in a three gallon agate pan with a gallon of fresh water, and still holding the cheesecloth twisted, the contents are worked into a dough. Finally the contents are reduced in size and the substance comes through the cheesecloth and thickens the water. After the water is good and thick pour it into the seven and one-half gallon container. Then place the cloth and contents in a three gallon pan with a little fresh water and loosen just enough to allow the water to go through and mix so that it can work as a dough, and the water is then poured off into the porcelain container to thicken the substance. There should then be about three and one-half gallons of this substance properly thickened. When all the substance has been removed from the grains, the remaining pulp may be fed to the chickens. To this liquid substance add fourteen pounds of granulated sugar in the same seven and one-half gallon container and stir well with a paddle and then let it cool. Then add two gallons of milk, from six to eight per cent. butter fat and any desired flavoring and coloring. Eighteen yolks of fresh eggs are used for the vanilla custard, and other flavors require about one dozen. The substance is then placed in a ten gallon freezer running from sixty to seventy revolutions per minute until it is thoroughly congealed.

The finished product may be cut into blocks or may be molded in suitable glasses or tins and will then be ready for sale or for use.

From the foregoing it will be obvious that a frozen confection made in accordance with this invention will be wholesome and palatable, and is not expensive to manufacture and provides a very desirable and delicate dessert which will be digestible.

What is claimed is:—

1. A frozen confection comprising a paste made from two ounces of rice, eight ounces of barley, eight ounces of hominy, three gallons of pure water, said materials being boiled and strained, reduced to a paste, and having added granulated sugar, fourteen pounds, and two gallons of milk, and the materials being flavored and frozen.

2. The process of preparing a frozen confection which consists in taking rice, barley, hominy, water, boiling said materials, straining said materials, adding cold water to the materials and cooling them, and adding granulated sugar, milk, eggs and a flavoring substance, and then freezing said materials and molding it in suitable receptacles.

3. A process of preparing a frozen confection which consists in boiling a quantity of rice, barley and hominy together, straining the materials, adding cold water to the materials, and mixing a quantity of granulated sugar and milk in the compound, and then freezing the same and molding it in suitable receptacles or cutting it in blocks.

In testimony whereof I affix my signature in presence of two witnesses.

ALBERT TOCA.

Witnesses:
MAURICE JACKSON,
HENRY L. GARLAND.